(12) United States Patent
Zhang et al.

(10) Patent No.: US 7,537,523 B2
(45) Date of Patent: May 26, 2009

(54) DYNAMIC PLAYER GROUPS FOR INTEREST MANAGEMENT IN MULTI-CHARACTER VIRTUAL ENVIRONMENTS

(75) Inventors: Bo Zhang, Beijing (CN); Baining Guo, Beijing (CN); Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 10/882,926

(22) Filed: Jun. 30, 2004

(65) Prior Publication Data

US 2006/0003823 A1    Jan. 5, 2006

(51) Int. Cl.
*A63F 9/24*   (2006.01)
*G06F 15/16*  (2006.01)

(52) U.S. Cl. .............................. 463/42; 709/204; 463/1
(58) Field of Classification Search .................... 463/1, 463/42; 709/204, 207, 223
See application file for complete search history.

(56) References Cited

U.S. PATENT DOCUMENTS 5,548,694 A  *  8/1996  Frisken Gibson ............ 345/424
6,370,565 B1 *  4/2002  Van Gong ................... 709/205
7,085,571 B2 *  8/2006  Kalhan et al. ............... 455/440

OTHER PUBLICATIONS

Sandeep K. Singhal. Effective Remote Modeling in Large-Scale Distributed Simulation and Visualization Environments. Ph.D. thesis, Standford University, Stanford, CA, Aug. 1996.
Jouni Smed, Timo Kaukoranta, and Harri Hakonen. Aspects of Networking in Multiplayer Computer Games. The Electronic Library, vol. 20, No. 2, pp. 87-97, 2002.
Michael R. Macedonia, Michael J. Zyda, David R. Pratt, Donald P. Brutzman, and Paul T. Barham. Exploiting Reality with Multicast Groups: A Network Architecture for Large-Scale Virtual Environments. IEEE Computer Graphics and Applications, vol. 15, No. 5, pp. 38-45, Sep. 1995.
Emmaunual Lety, Thierry Turletti. Issues in Designing a Communication Architecture for Large-Scale Virtual Environments. In Proceedings of the 1st International Workshop on Networked Group Communication, Pisa, Italy, Nov. 1999.
Li Zou, Mostafa Ammar, and Christoph Diot. An Evaluation of Grouping Techniques for State Dissemination in Networked Multi-User Games. In Proceedings of the Ninth International Symposium on Modeling, Analysis, and Simulation of Computer and Telecommunications Systems (MASCOTS ' 01), Aug. 2001.
Howard Abrams, Kent Watsen, and Michael Zyda. Three Tiered Interest Management for Large-Scale VEs. In Proceedings of the 1998 ACM Symposium on Virtual Reality Software and Technology (VRST ' 98), Taipei, China, 1998.

* cited by examiner

*Primary Examiner*—Dmitry Suhol
*Assistant Examiner*—Robert Mosser
(74) *Attorney, Agent, or Firm*—Theodore M. Magee; Westman, Champlin & Kelly, P.A.

(57) ABSTRACT

A method and apparatus improve the efficiency of simulating a virtual environment by filtering information about the virtual environment on a group basis instead of a character basis. The filtered information is sent to each client associated with a character in the group.

27 Claims, 5 Drawing Sheets

DYNAMIC PLAYER GROUPS FOR INTEREST MANAGEMENT IN MULTI-CHARACTER VIRTUAL ENVIRONMENTS

BACKGROUND OF THE INVENTION

The present invention relates to multi-player virtual computing environments. In particular, the present invention relates to interest management for multi-player virtual environments.

In multi-player virtual environment computing systems, a central controller, typically a server, defines a virtual environment or world in which virtual characters can move and interact with each other. Some of the virtual characters in the environment are controlled by players who are connected to the central controller as clients. Other virtual characters are controlled by the central controller.

Typically, the virtual environment is incrementally updated by the central controller using an update cycle. During each cycle, the central controller collects messages from each player that indicate actions that the player wants their virtual characters to perform in the environment. The central controller then determines actions for the virtual characters it controls. After the actions of all of the virtual characters have been executed, update messages are sent to each player to indicate how the virtual environment and virtual characters have changed.

For massive virtual environments that contain thousands of virtual characters, it becomes impossible to send messages for all of the changes in the environment to each player. To limit the amount of information that is sent to any one player, many systems use techniques known as interest management in order to filter the information that is provided to a player. One common criterion for filtering is the distance between a player's character and an object or character that has changed in the virtual environment. In particular, changes that occur beyond a specified radius from the player's character are filtered out so that they are not provided to the player.

One technique for performing such distance-based interest management involves dividing the virtual environment into cells. For each player's character, the controller identifies a set of cells that are within a given radius of the player's character. Any changes to the environment that occur in those cells are transmitted to the player while changes in other cells are filtered from the player. Note that in this type of system, if a cell is selected, the player receives information for every character of that cell regardless of the actual distance between the character and the player's character. Thus, if the cell is large, the player can receive information on characters that are of little interest to the player.

In other interest management techniques, the controller determines which objects and characters are within a given distance of the player's character and then only sends messages for the objects and characters that are within that distance. Changes that occur outside of that distance of interest, are not communicated to the client.

In both of the interest management techniques of the prior art, the filtering of the player messages is done on a player-by-player basis. Thus, even if two players' characters are near each other in the environment, a separate filtering operation has to be performed for each player. This creates a large burden on the controller.

SUMMARY OF THE INVENTION

A method and apparatus improve the efficiency of simulating a virtual environment by filtering information about the virtual environment on a group basis instead of a character basis. The filtered information is sent to each client associated with a character in the group.

DETAILED DESCRIPTION OF ILLUSTRATIVE EMBODIMENTS

The present invention improves the efficiency of virtual world simulations in which multiple users or machines can control entities within the virtual environment. Such virtual environments are common in massive multi-player on-line games.

Figure 1:
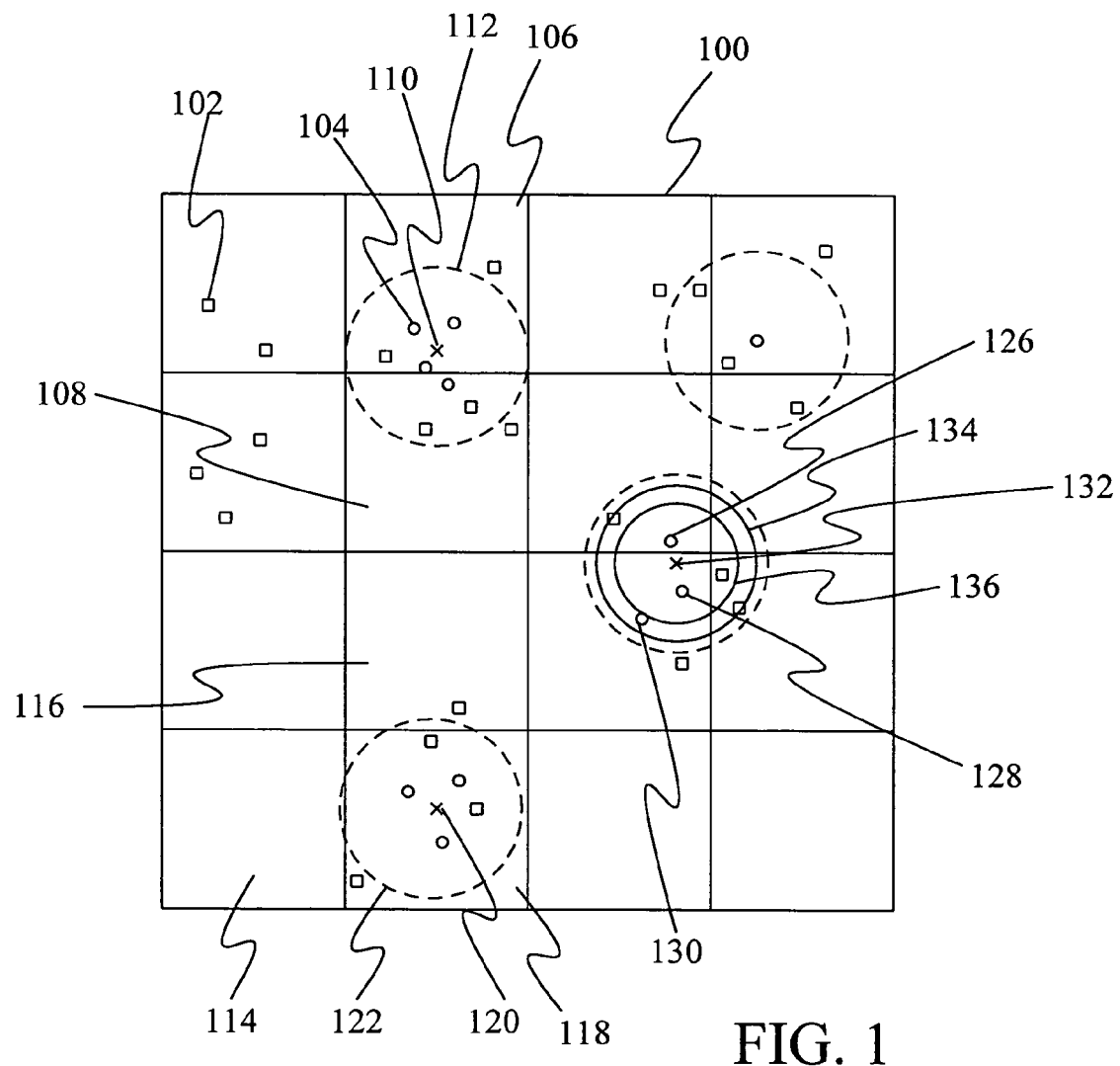
FIG. 1 is a layout of a virtual environment under one embodiment of the present invention.

As shown in FIG. 1, the virtual environment typically consists of a map space 100 that is populated with system entities, such as system entity 102, which are shown as small squares in FIG. 1, and player entities (also referred to as characters), such as player entity 104, which are shown as small circles in FIG. 1. The system entities can include mobile entities such as monsters and system-controlled characters that can move within map space 100 as well as stationary entities such as buildings. The system entities are controlled by a central controller, typically a server, while the player entities are controlled by users or machines connected to the system, typically as clients of the server.

Figure 2:
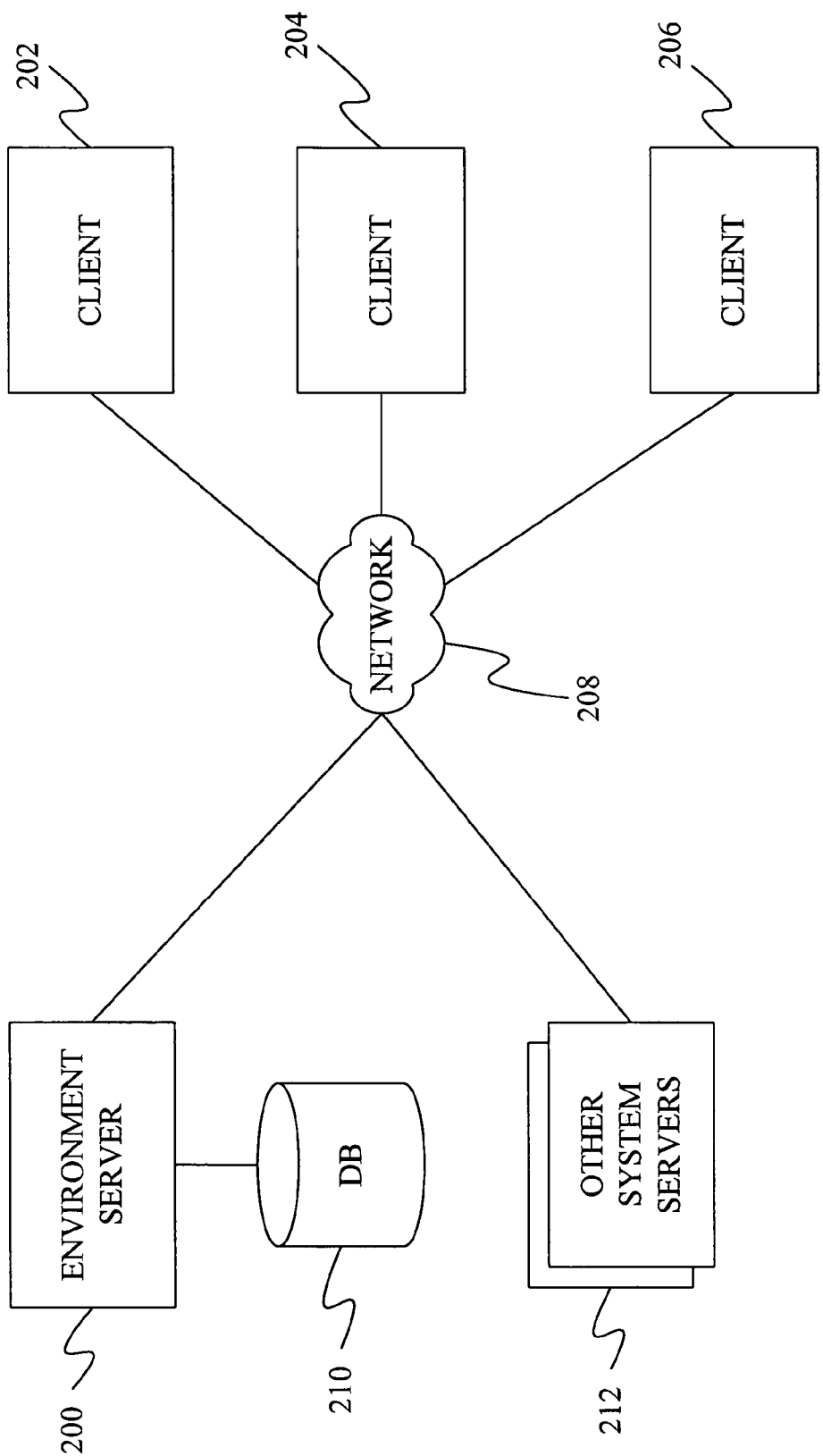
FIG. 2 is a block diagram of a server-client architecture in which embodiments of the present invention may be practiced.

One architecture for simulating a virtual environment under some embodiments of the present invention is shown in FIG. 2. In FIG. 2, an environment server 200 acts as the central controller and is responsible for controlling the state of the environment, the behavior of system controlled entities within the environment, and the coordination and communication of changes in the environment. Environment server 200 communicates with multiple clients 202, 204, and 206 through a network 208 such as an Intranet or the Internet. Clients 202, 204, and 206 are separately responsible for rendering images and sounds that correspond to the virtual environment based on the state of the virtual environment provided by environment server 200. This state information includes the position and state of each character or entity in the environment as well as changes in the typography, weather, lighting and visibility within the environment. Environment server 200 stores state information for the various entities and the world in a database 210.

The virtual environment system can optionally include other system servers 212 such as authentication servers for authenticating new players, and a communication server. For simplicity in the discussion below, a single server 200 is considered to control the entire environment. However, those skilled in the art will recognize that more complex server architectures, including server networks, are within the scope of the present invention. Further, although FIG. 2 shows a network environment, the present invention may be practiced within a single computer in which multiple clients are designated within the computer. The invention may also be practiced in a distributed peer-to-peer network.

The servers and clients of FIG. 2 typically include at least some form of computer readable media. Computer readable media can be any available media that can be accessed by the servers, the clients, or both. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the servers or the clients. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The present invention improves the efficiency of virtual environment simulations by reducing the number of filtering operations that need to be performed during each update cycle. As discussed above, under the prior art, filtering operations are performed to reduce the amount of information provided to each client so that the client only receives information that is of interest to the client. Thus, instead of learning about changes to all of the entities in the virtual environment, the client will only learn about changes that affect the portion of the world that is relevant to the client.

Under the prior art, such filtering was performed on a client-by-client basis, thereby requiring separate filtering operations for each client. The present invention reduces the number of needed filtering operations by grouping client characters into common interest groups and performing filtering operations for the group instead of for the individual client characters within the group. This reduces the total number of filtering operations that need to be performed during any one update cycle.

Figure 3:
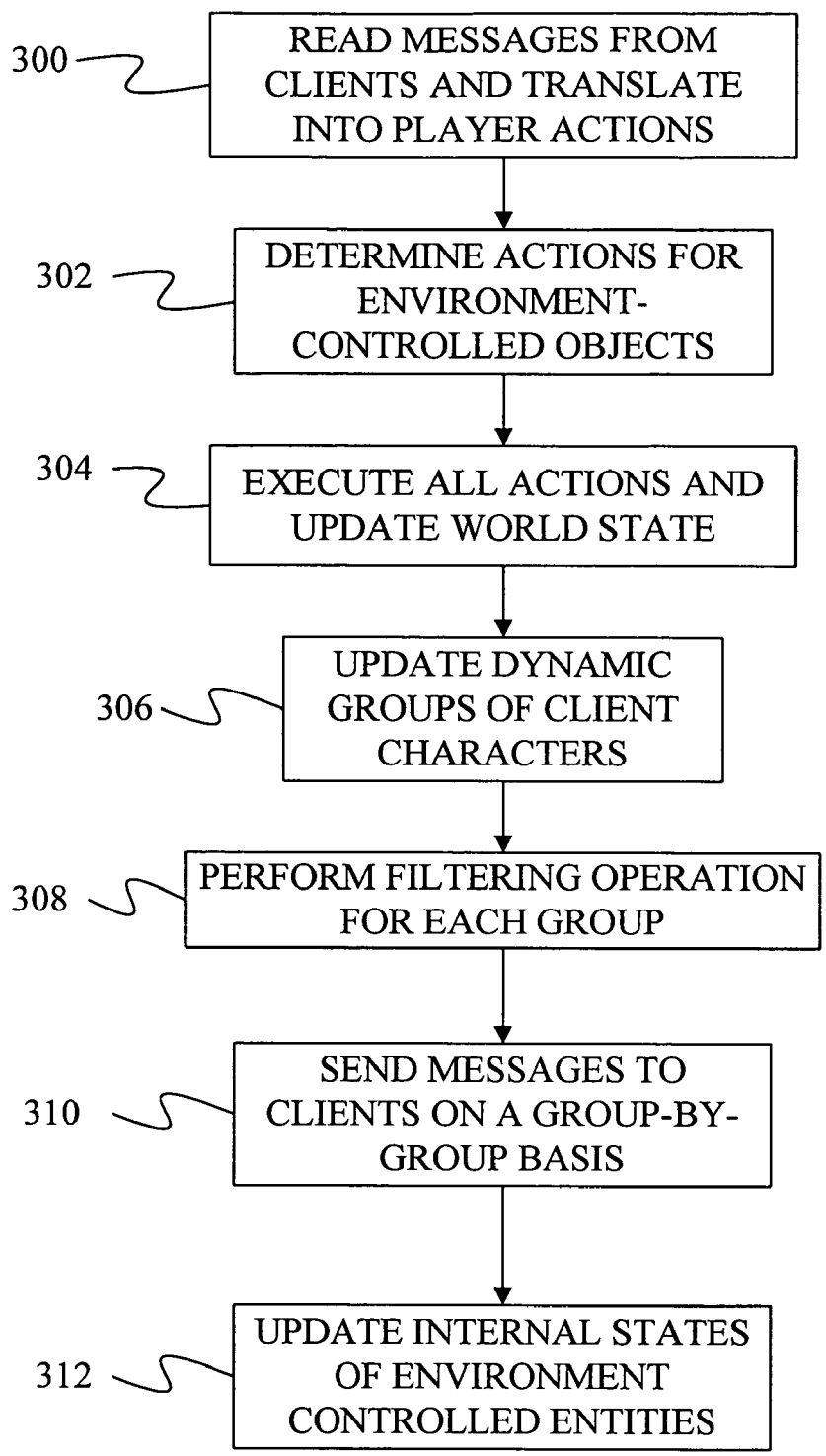
FIG. 3 is a flow diagram for an update cycle under one embodiment of the present invention.

FIG. 3 provides a flow diagram of a single update cycle for updating the virtual environment under some embodiments of the present invention. In step 300 of FIG. 3, each client provides messages to server 200 and server 200 translates these messages into player actions. At step 302, server 200 determines a set of actions for environment controlled entities such as environment controlled characters based on the previous world state. At step 304, all of the actions determined in steps 300 and 302 are executed and the world state is updated.

In step 306, dynamic groups of characters are updated, where a dynamic group consists of a collection of client characters that are near each other in the virtual environment such that they are likely to have common interests in the virtual environment and therefore are likely to want to receive the same information about the environment. At step 308, a filtering operation is performed for each group and at step 310, messages are sent to each client with the results of the filtering operation on a group-by-group basis. Thus, every client associated with a particular group receives the same set of messages as every other client in the group. As a result, separate filtering operations do not have to be performed for each client. Instead, they only have to be performed for each group.

At step 312, the internal states of the environment controlled entities are updated.

Figure 4:
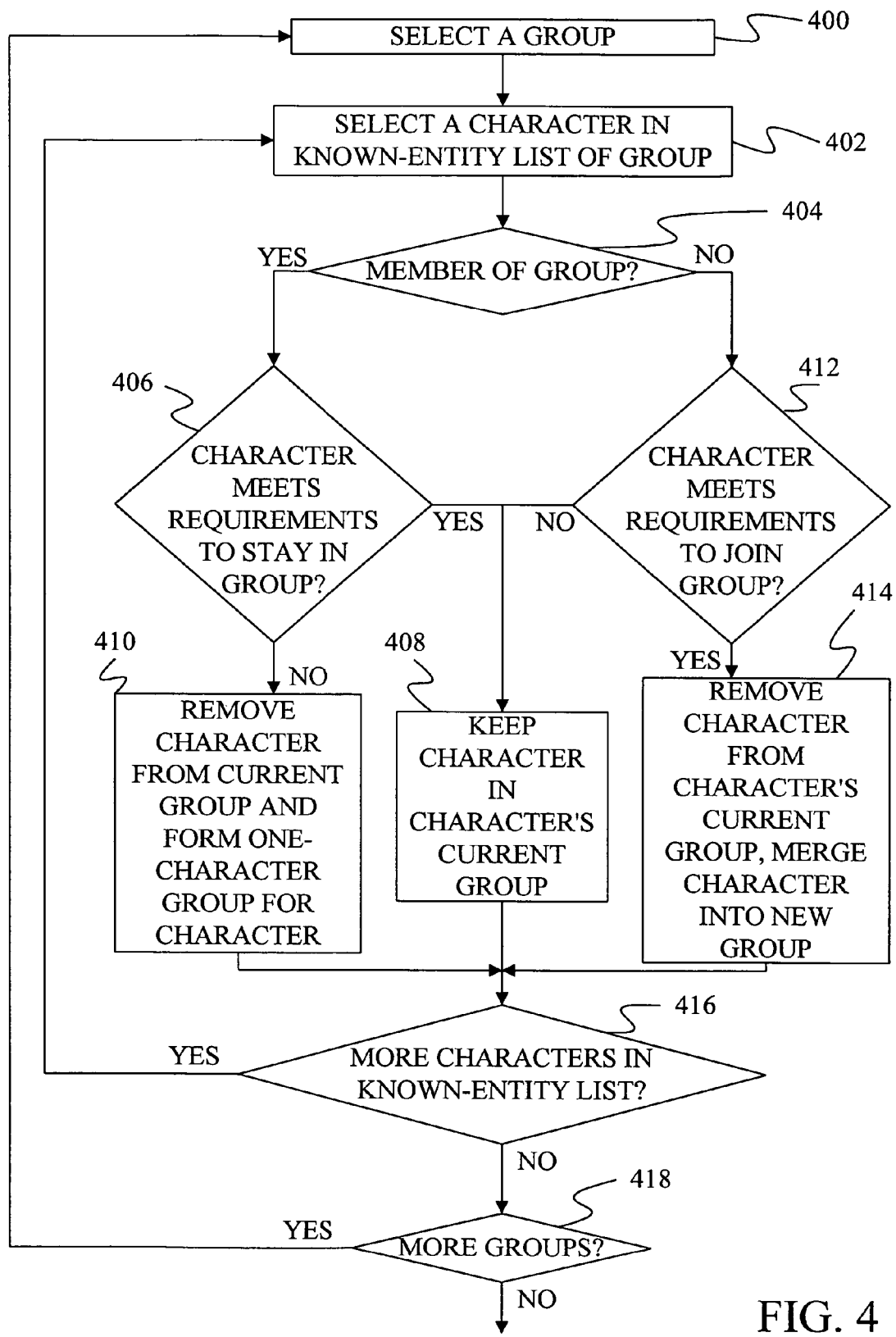
FIG. 4 is a flow diagram for updating dynamic groups of players.

FIG. 4 provides a more detailed flow diagram of a method of updating the dynamic groups of client characters, which is shown as step 306 in FIG. 3. In step 400 of FIG. 4, one of the existing groups in the virtual environment is selected. Initially, each client's character is designated as its own dynamic group consisting of a single client character. At step 402, the known-entity list of the group is examined and a client's character in the known-entity list is selected. A known entity list is a list of entities that members of the group have previously been given detailed information about. This detailed information allows the client to render the entity and allows the server to send a smaller set of information when the state of the entity changes. Thus, instead of sending all of the detailed information for the entity, the server only has to send information on what has changed about the entity if the entity is found in a group's known-entity list. Under one embodiment, each client character that is a member of the group is found in the group's known-entity list.

At step 404, the server determines if the selected character from the group's known-entity list is a member of the group. It is possible that characters can be a member of the group's known-entity list while not being in the group itself. This will occur if a player is close enough to the group to be of interest to the group but not close enough to the group to be an actual member of the group.

If the character is a member of the group, the server determines if the character meets the requirements that have been set to stay in the group at step 406. Under one embodiment, there are two requirements for a player to remain within a group. First, the character must be within a threshold distance of the center of the group. For example, in FIG. 1, a group consisting of characters 126, 128 and 130 has a group center 132. The minimum distance required to remain in that group forms a circle 134 around the group. Since characters 126, 128, and 130 are all within circle 134, they all meet the first requirement for remaining in that group. Under one embodiment, the minimum distance calculation is determined using the character's current position as set in step 304 of FIG. 3 and the center of the group as determined in the previous update cycle.

The second requirement for a character to remain in a group is that the bandwidth of the client associated with the character must be greater than a minimum required bandwidth for the group. The minimum bandwidth requirement is set so as to prevent a single low bandwidth client from limiting the amount of information that can be passed to the other clients of the group. Under one embodiment, the bandwidth of the client is evaluated at each update cycle during step 406. As a result, if the bandwidth of the client changes over a period of time, the client's character may be dropped from the group to allow for better performance for other clients. Under one embodiment, the minimum bandwidth was set at 750 bits per second.

If the character meets the requirements to stay in the group at step 406, the character is kept in the character's current group at step 408. However, if the character does not meet the requirements to stay in the group, the character is removed from the current group at step 410 and is placed as its own group, as it would have been when the character was first added to the virtual environment.

If the character selected at step 402 is not a member of the group, the server determines if the character meets the requirements needed to join the group at step 412. Under one embodiment, there are four requirements to join a group. First, the client associated with the character must have a minimum bandwidth. Under one embodiment, this minimum bandwidth is higher than the minimum bandwidth required to drop a character from a group. The reason for setting the bandwidth higher for joining a group is to ensure that even with bandwidth fluctuations, the character is likely to remain a member of the group. This reduces the possibility that a character will alias in its membership of a group due to bandwidth limitations. In one particular embodiment, the minimum bandwidth to join the group is 1000 bits per second.

The second requirement to join a group is that the client character must be within a minimum distance of the group center where the position of the player is the position achieved after step 304 and the group center is the center determined in the previous update cycle. For example, in FIG. 1 the minimum distance for joining the group consisting of characters 126, 128 and 130 forms a circle 136 around group center 132. In order to join this group, a character would have to be within circle 136. Under one embodiment, the minimum distance for joining a group is less than the minimum distance required to remain a member of the group. FIG. 1 shows an example of such an embodiment where circle 136 for joining a group is smaller than circle 134 for being removed from a group. This reduces aliasing of membership in a group based on position. Under one embodiment, the minimum distance to join the group is 32 while the minimum distance to remain in the group is 64.

The third requirement for joining a group is that the group that the character is being considered for must be larger than the character's current group. This favors the formation of larger groups and encourages more stable group membership. A character that is alone is considered to be in a group with one member.

Lastly, a character must be present in the virtual environment for at least a minimum period of time before they can join a group. This is done to ensure that the character's known-entity list has been populated before trying to integrate the character into a group. Under most embodiments of the present invention, when a character is added to a group, the known-entity list for the group must be combined with the known-entity list of the character. Since new characters have an empty known-entity list, this would require a great deal of time and may be difficult to do in one update cycle.

By waiting to add a character to the group, the character's known-entity list may be updated over a number of update cycles before trying to integrate the two lists. Since the character is close to the group, this progressive updating should result in a known-entity list for the character that is similar to the group's known-entity list. As a result, after the character has been in the environment for a minimum amount of time, it is easier to combine the two known-entity lists and thus is easier to add the character to the group.

If the character meets the requirements to join the group at step 412, the character is removed from its current group and is merged into the new group at step 414. In order to remove a character from a group, the character is simply marked as being a member of the new group instead of the character's current group.

In order to merge a character into a group, the known-entity list of the character and the group must be combined. Under one embodiment, this is performed by intersecting the two known-entity lists such that if an entity is not known by both the character and the group, it is dropped from the combined known-entity list. In addition, if a "dirty" bit has been set for any entity in either of the known-entity lists, it continues to be set in the combined known-entity list for the group. Such "dirty" bits indicate that a known entity has changed during the execution of an action in step 304 and that an update for that entity should be sent to the client or the members of the group.

In addition to the basic intersection of the known-entity lists, the formation of the combined known-entity list must ensure that all of the characters that are members of the group are in the combined known-entity list. This is done in step 414, because later it is assumed that all of the characters in a group know all of the other characters in the group.

If a character does not meet the requirements to join a group at step 412, the character is kept in their current group at step 408.

At step 416, the server determines if there are more characters in the current known-entity list. If there are more characters, a new character is selected at step 402 and the steps between step 402 and 416 are repeated. When there are no more characters in the known-entity list of the current group at step 416, the server determines if there are more groups at step 418. If there are more groups in the virtual environment, the process returns to step 400 and selects a new group. Steps 402-416 are then repeated for the new group. When there are no more groups in the virtual environment at step 418, the process of updating the dynamic groups of client characters is complete.

Figure 5:
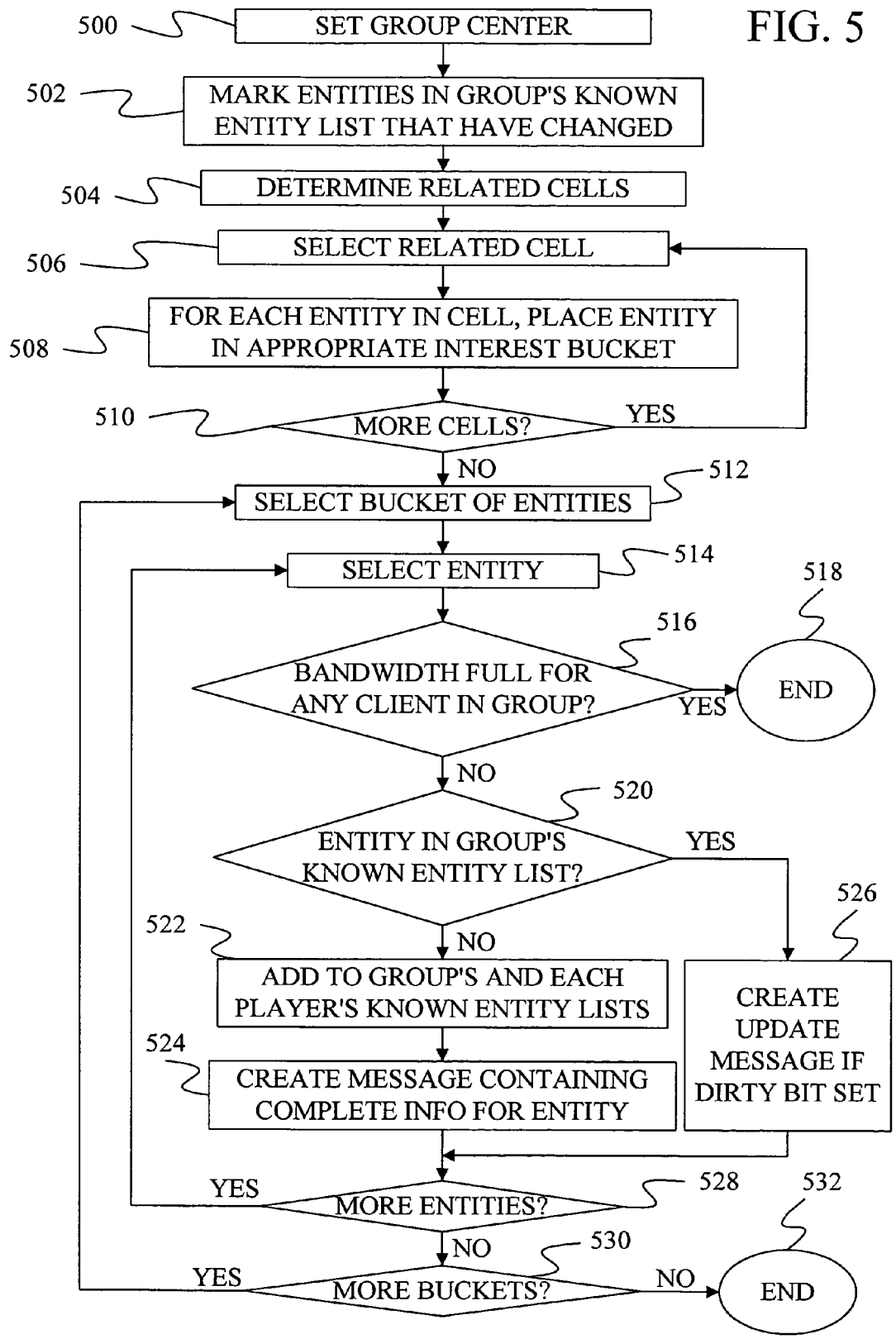
FIG. 5 is a flow diagram for updating the information for each group under one embodiment of the present invention.

FIG. 5 provides a more detailed flow diagram of the steps involved in performing filtering operation 308 of FIG. 3 for each group. In step 500, the group center for the group is set using the position of the member characters identified in step 306. Under one embodiment, the group center is set as the average of the position of the client characters that are members of the group. Thus, the x coordinate of all of the client characters is averaged to form the x coordinate of the group center and the y coordinate of the client characters is averaged to form the y coordinate of the group center.

At step 502, entities in the group's known-entity list that have changed at step 304 are marked by setting their "dirty" bits.

At step 504, the process determines which cells in the virtual environment are related to the current group. Under this embodiment of the invention, the virtual environment is divided into cells such as cells 106, 108, 114, 116, and 118 of FIG. 1. In FIG. 1, the cells are shown as being equally sized. However, in other embodiments, the cells may be different sizes depending on the location of entities within the virtual world. In particular, smaller cells may be used where there are a large number of entities and larger cells may be used where there are a small number of entities.

In step 504, the process determines which cells are related to the current group by determining which cells are within a specified distance of the group's center. For example, in FIG. 1, cells 106 and 108 are shown to be within the specified distance of group center 110 as indicated by circle 112. Similarly, cells 114, 116, and 118 are shown to be related to the group that has a group center 120 as indicated by the specified distance circle 122.

Once the related cells have been identified, one of the related cells is selected at step 506. At step 508, each entity in the selected cell is placed in an interest bucket of a bucket array. Under one embodiment, there are eight interest buckets, each associated with a different level of group interest. Under many embodiments, the interest is judged solely on the distance from the group center to the entity. For example, in one embodiment that uses eight buckets, there is a separate bucket associated with distances between the group center and the entity of 1-2, 3-4, 5-8. 9-16, 17-32, 33-64, 65-128, and 129-256. Entities that are more than some maximum distance from the group center are not placed in any of the buckets. Under some embodiments, different distances are used for different types of entities. For example, a building entity may be visible if the distance is less than 400 while a character entity will only be visible if the distance is less than 200.

After all of the entities of a cell have been placed in an interest bucket or discarded as being too far from the group center, the process determines if there are more related cells for the group at step 510. If there are more related cells, the process returns to step 506 to select another related cell and step 508 is repeated for the newly selected cell.

When there are no further related cells for the current group at step 510, the process continues at step 512 where a bucket of entities is selected. In particular, the bucket that contains the entities of most interest is selected. Thus, if the interest determination is based on distance from the group center, the bucket that contains entities that are closest to the group center is selected.

At step 514, an entity within the selected bucket is selected. At step 516, the bandwidth for each client in the group is determined to determine if the bandwidth for any of the clients is full. If the bandwidth for any of the clients is full, the process ends at step 518. This ensures that all group members receive the same amount of information about the entities.

If the bandwidth is not full for any of the clients in the group, the process determines if the selected entity is in the group's known-entity list at step 520. If the entity is not in the group's known-entity list, the entity is added to the group's known-entity list and to the known-entity list of each character in the group at step 522. At step 524, a complete set of information for the entity is sent to each client of the group so that each client is able to fully render the entity.

If the entity is in the group's known-entity list, the process sends an update for the entity to all clients of the group if the "dirty" bit is set for the entity in the known-entity list. Thus, if the entity has changed since the last update cycle, these changes are provided to each client. If the "dirty" bit has not been set for the entity in the group's known-entity list, the entity is deemed to have not changed in this update cycle and no information needs to be sent to any of the clients.

After the information for the entities has been updated and sent to the clients, the process determines if there are more entities in the current bucket at step 528. If there are more entities, the next entity is selected at step 514 and steps 516-526 are repeated for the newly selected entity. If there are no more entities in the current entity bucket, the process determines if there are more buckets at step 530. If there are more buckets, the next bucket is selected at step 512, by selecting the bucket of next lower interest from the current bucket. Steps 514-528 are then repeated for the new bucket. When there are no more buckets of interest to process at step 530, the filtering process ends at step 532.

As can be seen in FIG. 5, the filtering operation is performed on a group-by-group basis such that the decisions as to which entities to provide information for is determined for a group instead of each of the individual client characters within the group. This reduces the number of filtering operations that need to be performed and thus reduces the burden on the server processor when performing the update cycle.

Although the present invention has been described with reference to particular embodiments, workers skilled in the art will recognize that changes may be made in form and detail without departing from the spirit and scope of the invention.

What is claimed is:

1. A method comprising:
an environment server selecting a sub-set of entities from a set of entities in a virtual environment as being of interest to a group of characters comprising at least two characters in the virtual environment, the sub-set of entities being separate from the characters of the group of characters and each character of the group having a position in the virtual environment described by an x coordinate and a y coordinate, wherein the environment server selecting an entity as being of interest to the group of characters comprises:
the environment server determining an x coordinate and a y coordinate for a position of a group center for the group, the x coordinate for the group center being determined by averaging the x coordinates of the positions of all of the characters of the group and the y coordinate for the group center being determined by averaging the y coordinates of the positions of all of the characters of the group, the position of the group center being different from the positions of all of the characters of the group;
the environment server determining a distance between the position of the entity in the virtual environment and the group center; and
the environment server selecting the entity as being of interest to the group of characters if the determined distance is less than a threshold distance; and
the environment server transmitting a set of messages to clients corresponding to the characters of the group to convey information about the sub-set of entities.

2. The method of claim 1 further comprising the environment server defining a group of characters.

3. The method of claim 2 wherein defining a group of characters comprises examining a character in a known-entity list associated with a group to determine if the character should be added to the group.

4. The method of claim 3 wherein determining if a character should be added to the group comprises determining if the character has been in the virtual environment more than a threshold period of time.

5. The method of claim 3 wherein determining if a character should be added to the group comprises determining if the character is within a minimum distance of the group center of the group.

6. The method of claim 3 wherein determining if a character should be added to the group comprises determining if a client associated with the character has a bandwidth that exceeds a minimum bandwidth.

7. The method of claim 3 wherein determining if a character should be added to the group comprises determining that a character should be added to the group if the group has at least as many characters as a current group of which the character is currently a member.

8. The method of claim 2 wherein defining a group comprises adding a character to the group by intersecting a known-entity list associated with the character and a known-entity list associated with the group to form a known-entity list for the group.

9. The method of claim 8 wherein intersecting the known-entity list associated with the character with the known-entity list associated with the group comprises intersecting while ensuring that all of the characters that are members of the group are in the known-entity list of the group.

10. The method of claim 2 wherein defining a group comprises determining whether to remove a character from a group.

11. The method of claim 10 wherein determining whether to remove a character from a group comprises determining if the distance between the character and the group center of the group exceeds a maximum distance for remaining a member of the group.

12. The method of claim 11 wherein defining a group further comprises determining whether to add a character to the group by determining if the distance between the character and the group center of the group is less than a maximum distance for joining the group, the maximum distance for joining the group being less than the maximum distance for remaining a member of the group.

13. The method of claim 10 wherein determining whether to remove a character from a group comprises determining if a client associated with the character has a bandwidth that has dropped below a minimum bandwidth required to remain in the group.

14. The method of claim 13 wherein defining a group further comprises determining whether to add a character to the group by determining if a client associated with the character has a bandwidth that is above a minimum bandwidth required to join the group, the minimum bandwidth required to join the group being greater than the minimum bandwidth required to remain in the group.

15. A computer-readable storage medium having encoded thereon computer-executable instructions that when executed by a processor cause the processor to perform steps comprising:
dividing a virtual environment into multiple cells;
forming a group of characters in the virtual environment, the group of characters comprising at least two characters and each character having a position in the virtual environment comprising an x coordinate and a y coordinate;
filtering information about the virtual environment on a group basis instead of a character basis for the group of characters in the virtual environment to form filtered information by identifying a plurality of cells related to the group instead of identifying cells for each character separately and identifying a set of entities in the identified cells that is of interest to the group, wherein identifying an entity that is of interest to the group comprises:
determining an x coordinate for a position of a group center for the group of characters by averaging the x coordinates of all of the characters of the group;
determining a y coordinate for the position of the group center for the group of characters by averaging the y coordinates of all of the characters of the group, wherein the position for the group center is different from all of the positions of the characters of the group;
determining a distance from the group center to the entity;
determining that the distance form the group center to the entity is less than a maximum distance for adding an entity to the set of entities and adding the entity to the set of entities that is of interest to the group; and
sending the filtered information for the group to clients associated with each of the characters of the group.

16. The computer-readable storage medium of claim 15 further comprising identifying a group of characters.

17. The computer-readable storage medium of claim 16 wherein identifying a group of characters comprises determining if a character in a known-entity list for the group should be added to the group.

18. The computer-readable storage medium of claim 17 wherein only characters in the known-entity list for the group are examined to determine if they should be added to the group.

19. The computer-readable storage medium of claim 17 wherein determining if a character should be added to the group comprises determining if the character is within a minimum distance of the group.

20. The computer-readable storage medium of claim 17 wherein determining if a character should be added to the group comprises determining if a client associated with the character has a bandwidth that is at least as large as a minimum bandwidth.

21. The computer-readable storage medium of claim 17 wherein determining if a character should be added to the group comprises determining that the character should be added to the group if the group that the character would be added to is at least as large as a group that the character currently belongs to.

22. The computer-readable storage medium of claim 17 wherein determining if a character should be added to the group comprises determining if the character has been present in the virtual environment for more than a minimum period of time.

23. The computer-readable storage medium of claim 16 wherein identifying a group of characters comprises adding a character to a group by intersecting a known-entity list of the group with a known-entity list of the character to form a new known-entity list for the group.

24. The computer-readable storage medium of claim 23 wherein intersecting a known-entity list of the group with a known-entity list of the character further comprises ensuring that all of the characters in the group are in the new known-entity list for the group.

25. The computer-readable storage medium of claim 16 wherein identifying a group of characters comprises determining whether to remove a character from a group.

26. The computer-readable storage medium of claim 25 wherein determining whether to remove a character from a group comprises determining whether the character is positioned more than a maximum distance from the group in the virtual environment.

27. The computer-readable storage medium of claim 25 wherein determining whether to remove a character from a group comprises determining whether a client associated with the character has a bandwidth that is below a minimum required bandwidth.

* * * * *